United States Patent Office 2,694,702
Patented Nov. 16, 1954

2,694,702

SOLUBLE CHLOROMETHYLATED POLYMERS OF STYRENE AND ALPHA-METHYL STYRENE, THEIR QUATERNARY AMMONIUM SALTS AND METHOD OF MAKING THE SAME

Giffin D. Jones, Sanford, Mich., assignor to The Dow Chemical Company, Midland, Mich., a corporation of Delaware No Drawing. Application April 13, 1951,
Serial No. 220,982

19 Claims. (Cl. 260—93.5)

This invention concerns certain new resinous derivatives of the solid homopolymers and copolymers of styrene and alpha-methyl styrene. It relates more particularly to benzene-soluble chloromethylated polymers of such alkenyl aromatic hydrocarbons and water-soluble aminated derivatives thereof containing quaternary ammonium groups. The invention also concerns a method of making the new compositions.

The new chloromethylated polymeric products of the invention are all soluble in organic solvents for polystyrene such as benzene, toluene, xylene, ethylbenzene, dioxane, carbon tetrachloride and tetrachloroethane, and contain reactive chloromethyl radicals as substituents on aromatic nuclei thereof, i. e. the chlorine atom of the chloromethyl radical may readily be displaced in known ways with other groups of radicals such as hydroxyl, ammonium or primary-, secondary-, or tertiary-amino radicals, to form the corresponding derivatives of the chloromethylated polymers. The chloromethylated polymers of the invention contain an average of from 0.1 to 1 chloromethyl radical per aromatic nucleus. They are useful as intermediate agents for the production of such other polymer derivatives. Certain of the ungelled, or toluene-soluble, chloromethylated polymers of the invention, especially those containing chloromethyl radicals as nuclear substituents in amount corresponding to an average of from 0.4 to 1 chloromethyl radical per aromatic nucleus in the polymer, are of particular interest in that they may be reacted with a tertiary acyclic monoamine, e. g. trimethylamine, to form water-soluble resinous compositions containing quaternary ammonium groups, i. e. a water-soluble resinous product which is a quaternary ammonium base, or a salt thereof. Such resinous quaternary ammonium compositions are useful as precipitating or flocculating agents for removing soluble acidic substances from aqueous solutions, e. g. for separating acidic color substances from aqueous solutions of sugar or molasses.

The reaction products of a tertiary amine with the benzene-soluble chloromethylated polymers containing an average of from 0.1 to 0.35 chloromethyl radical per aromatic nucleus are insoluble in water. They are useful for absorbing anions from water. Such resinous quaternary ammonium bases or salts may be dissolved in a solvent, e. g. a mixture of equal parts by volume of water and acetone, or dioxane, and cast as a free film, or applied as a coating to a suitable base material such as paper or cloth and dried, which film or coated base material may be formed into strips, or a belt, suitable for absorbing anions from aqueous solutions. The resinous quaternary ammonium salts prepared by reacting a tertiary amine with the benzene-soluble chloromethylated polymers containing a higher ratio of chloromethyl radical per aromatic nucleus in the polymer, e. g. a ratio of from 0.4 to 1 to 1, are water-soluble products.

The new water-soluble resinous compositions which are quaternary ammonium bases, or salts thereof, can readily be prepared by chloromethylating the resinous polymers and copolymers of styrene and alpha-methyl styrene to a stage at which they remain ungelled and contain an average of from 0.4 to 1 chloromethyl radical per aromatic nucleus in the polymer, and reacting the chloromethylated polymer with an acyclic tertiary monoamine.

It has been found that the resinous polymers and copolymers of styrene and alpha-methyl styrene can readily be chloromethylated so as to obtain polymeric products containing reactive chloromethyl radicals attached to aromatic nuclei of the polymer in a ratio of from one to ten chloromethyl radicals per ten aromatic nuclei by reacting the polymer with chloromethyl methyl ether while the polymer is dissolved in the chloromethyl methyl ether, or in an organic solvent which is less reactive with the chloromethyl methyl ether than is the polymer, and discontinuing the chloromethylating reaction prior to gelling of the chloromethylated polymeric product. The chloromethylated polymeric products thus formed are substantially free from methylene cross-linkages between aromatic nuclei and are soluble in organic solvents such as benzene, toluene, dioxane, or dichlorodiethyl ether.

The homopolymers and copolymers of styrene and alpha-methyl styrene which are subjected to the chloromethylation reaction have average molecular weights of 5,000 or higher, e. g. from 5,000 to 120,000, as determined by the well known Staudinger viscosity method, and are solid resinous materials at room temperature. Such homopolymers of styrene, or of alpha-methyl styrene, and such copolymers of styrene and alpha-methyl styrene may be employed.

Two parts by weight or more of chloromethyl methyl ether are used per part of the polymer in chloromethylating the latter. The chloromethyl methyl ether is preferably used in amount sufficient to dissolve the polymer, e. g. in amounts corresponding to from 5 to 20 times the weight of the polymer, but may be used in smaller amounts, together with one or more other solvents which are inert to the polymer and are less reactive with the chloromethyl methyl ether than is the polymer. Examples of such other solvents are tetrachloroethane, chloroform, and saturated aliphatic hydrocarbons such as normal heptane and isooctane.

In carrying out the chloromethylation reaction, the polymer is dissolved in chloromethyl methyl ether, or a mixture of the latter with one or more of the other solvents just mentioned, to form a solution containing preferably from 5 to 20 per cent by weight of the polymer and containing at least 2 parts by weight of chloromethyl methyl ether per part of the polymer. A halomethylating catalyst such as zinc chloride, zinc bromide, stannic chloride, aluminum chloride, ferric chloride, or antimony pentachloride is added, preferably in anhydrous or substantially anhydrous condition and in granular or powdered form. The amount of catalyst required to obtain a satisfactory reaction varies widely depending upon the kind of catalyst used, the reaction temperature, and the proportion of the catalyst employed, based on the weight of the polymer. In general, an amount of the catalyst corresponding to from 1 to 50 per cent by weight of the polymer may be used, but the catalyst is usually employed in amount of from 15 to 35 per cent, based on the weight of the polymer. The occurrence of a Friedel-Crafts reaction which results in the formation of methylene cross-linkages between aromatic radicals of the polymer frequently occurs during the chloromethylation reaction and is dependent in part upon the catalyst employed. The chloromethylation catalysts just mentioned differ from one another considerably with regard to their tendency to promote the Friedel-Crafts reaction. Zinc halides appear to be less reactive as catalysts for the Friedel-Crafts reaction than the other catalysts and are highly effective in causing the desired chloromethylation reaction. For this reason, a zinc halide such as zinc chloride or zinc bromide is preferably employed.

The chloromethylating reaction is carried out at temperatures between −10° and 60° C., preferably at temperatures of from 10° to 50° C., and at atmospheric or substantially atmospheric pressure. The reaction is discontinued prior to gelling of the polymer so as to avoid the formation of any substantial amount of cross-linking between aromatic radicals of the polymer which results in the formation of chloromethylated polymeric products which are insoluble in the usual organic solvents for polystyrene, e. g. toluene. The course of the chloromethylation reaction can readily be followed by withdrawing a portion of the reacting mixture from the vessel and determining the viscosity of the solution. A gradual increase in the viscosity of the solution is usually observed as the chloromethylation reaction proceeds. Just prior to gelling of the polymer a sharp increase in the viscosity of the solution usually occurs. The reaction is discontinued prior to, or when such increase in viscosity of the reaction mixture is observed. Chloromethylation of the polymer is continued until an average of from 1 to 10 chloromethyl radicals per 10 aromatic nuclei in the polymer, i. e. until from 0.1 to 1 chloromethyl radical per aromatic nucleus in the polymer, is obtained. It may be mentioned that the degree of chloromethylation, i. e. the average number of chloromethyl radicals per aromatic nucleus in the polymer that can be introduced into the alkenyl aromatic resin, prior to gelling of the same varies widely, depending upon the relative proportions of the chloromethyl methyl ether and the polymer employed, the average molecular weight of the polymer, the temperature at which the reaction is carried out, and also upon the amount and activity, i. e. the tendency to promote the chloromethylation reaction, of the catalyst used in the reaction. In general, polymers of the alkenyl aromatic hydrocarbons, which polymers have a relatively low average molecular weight, e. g. a molecular weight of from 5,000 to 50,000, can be chloromethylated so as to obtain a greater number of chloromethyl radicals per aromatic nucleus in the polymer without gelling of the chloromethylated polymer, than can the polymers having a molecular weight of from 60,000 to 120,000, or higher, under otherwise similar chloromethylation conditions. With a polymer of a given molecular weight the extent to which the chloromethylation reaction can be carried without gelling of the chloromethylated polymer becomes greater as the proportion of the chloromethyl methyl ether relative to the amount of the polymer is increased. However, as previously mentioned, a noticeable increase in the viscosity of the reaction mixture usually occurs just prior to gelling of the polymer so that the ungelled chloromethylated polymers of the invention can readily be obtained by discontinuing the chloromethylation reaction when such increase in the viscosity of the reacting solution is observed. The chloromethylation reaction is stopped, or discontinued, by adding water, or a mixture of water and dioxane, preferably the latter, to the reaction mixture to destroy the action of the catalyst. The chloromethylated polymer is recovered from the reaction mixture by usual precipitation procedures, e. g. by precipitating the polymer in alcohol, or by spraying the reaction mixture into water. The chloromethylated polymeric product is separated by filtering and is dried, preferably in vacuum at temperatures below 50° C., so as to avoid deterioration of the product.

The chloromethylated polymeric product can be used in wet condition, or in dried condition, in the preparation of aminated derivatives containing quaternary ammonium groups by reaction of the benzene-soluble chloromethylated polymers with a tertiary monoamine. As previously mentioned the chloromethylated polymers containing an average of from four to ten chloromethyl radicals per ten aromatic nuclei in the polymer, when reacted with a tertiary amine, form water-soluble resinous compositions which are quaternary ammonium bases, or a salt thereof. Any tertiary monoamine may be used in the reaction. Examples of suitable tertiary amines are trimethylamine, triethylamine, tributylamine, tripropylamine, triamylamine, diethylmethylamine, benzyldimethylamine, dimethylphenylamine, diethylaniline, methyldiethanolamine, dimethylethanolamine, dimethylisopropanolamine and dimethylbutylamine. Mixtures of any two or more of such tertiary amines may also be used.

The proportion of the tertiary amine employed relative to the chloromethylated polymer used should be such that there is present in the reaction mixture at least one molecular proportion of the tertiary amine for each molecular equivalent chloromethyl radical in the polymeric reactant. The tertiary amine may be used in excess over the minimum proportion just stated. Usually from one to five molecular proportions of the tertiary amine are used per molecular equivalent chloromethyl radical in the polymer, and greater proportions may be used.

The reaction between the chloromethylated polymer and the tertiary amine may be carried out at atmospheric or superatmospheric pressure and at temperatures between 20° and 100° C. The reaction is usually carried out in the presence of an organic liquid which is a solvent for the chloromethylated polymer and the amine. Examples of such media are dioxane, toluene, or xylene. The amination reaction may also be carried out by dispersing the chloromethylated polymer in a medium which is a solvent for the tertiary amine such as water, acetone or ethyl alcohol, or the reaction may be carried out employing a large excess of the tertiary amine in which case no other dispersing medium need be used. Best results are usually obtained by dissolving the chloromethylated polymer in a solvent such as dioxane, adding the tertiary amine, or a solution of the tertiary amine in water, or ethyl alcohol, suitably in concentration of from 20 to 50 per cent by weight of the tertiary amine, to the solution of the chloromethylated polymeric material and maintaining the mixture at a reaction temperature until all, or nearly all, chlorine atoms of the chloromethyl radicals in the polymer are reacted, e. g. until each such chlorine atom is replaced by a nitrogen atom of the tertiary amine.

The aminated resinous derivative, or product, containing quaternary ammonium groups is recovered from the reaction mixture by evaporating the latter to dryness, preferably in vacuum and at temperatures below 50° C. The product is recovered in the form of a quaternary ammonium salt, i. e. the hydrochloride salt of the quaternary ammonium base.

The following examples illustrate ways in which the principle of the invention has been applied, but are not to be construed as limiting the invention.

EXAMPLE 1

A charge of 30 gallons of chloromethyl methyl ether was placed in a jacketed glass lined reaction vessel equipped with a reflux condenser and stirrer. It was stirred and 25 pounds of granular molding grade polystyrene was dissolved therein at room temperature. Thereafter, 4 pounds of anhydrous zinc chloride was added to the solution as chloromethylation catalyst and stirring of the mixture was continued over a reaction period of 8.5 hours. During the reaction period, the temperature of the mixture, without application of heating or cooling, increased from 24° to 36° C. over a period of 3.5 hours; from 36° to 42° C. during the next hour; from 42° to 50° C. in the following 2 hours; and then cooled from 50° to 40° C. during the succeeding 0.5 hour. The temperature of the mixture was maintained between 40° and 45° C. over the remainder of the reaction period. The chloromethylation reaction was stopped by adding to the mixture a solution consisting of three gallons of dioxane and one gallon of water. After standing for a short period, the mixture separated into a lower aqueous layer and an upper organic layer. The aqueous layer was withdrawn and discarded. A portion of the organic layer was poured into aprpoximately four times it volume of Formula 30 alcohol (a mixture of nine parts by volume of 95 per cent ethyl alcohol and one part of methyl alcohol) to precipitate the chloromethylated polystyrene. The product was separated by filtering and was washed with alcohol and dried in air at room temperature. The dry chloromethylated polystyrene was analyzed and found to contain 17.17 per cent by weight of chlorine. This corresponds to about 0.66 chloromethyl radical per aromatic nucleus in the polymer. The product was soluble in toluene.

EXAMPLE 2

A solution consisting of 20 grams of dioxane and 5 grams of the chloromethylated polystyrene of Example 1, was mixed with 50 cc. of an aqueous solution containing 23 per cent by weight of trimethylamine. The mixture was sealed in a glass bottle and agitated at room temperature over a period of 24 hours to aminate the chloromethylated polymer. The resulting solution was evaporated to dryness. The residue, i. e. the aminated product, was analyzed and found to contain 4.07 per cent by weight of nitrogen. The product was in the form of its quaternary ammonium chloride salt. It was soluble in water. A solution consisting of 0.5 per cent by weight of the aminated polymer in distilled water had an absolute viscosity of 23.3 centipoises at 25° C.

EXAMPLE 3

To a solution consisting of 20 cc. of dioxane and 5 grams of the chloromethylated polystyrene of Example 1, there was added 10 cc. of dimethylethanolamine. The solution was sealed in a glass bottle and agitated at room temperature over a period of 24 hours. Thereafter, the solution was evaporated to dryness in vacuum. The aminated product or residue was analyzed and found to contain 5.28 per cent by weight of nitrogen. The product was in the form of a quaternary ammonium chloride. It was soluble in water. A solution of 0.5 part by weight of the aminated product and 99.5 parts of water had an absolute viscosity of 14.8 centipoises at 25° C.

By procedure similar to that just mentioned, a solution consisting of 5 grams of the chloromethylated polystyrene of Example 1 and 20 cc. of dioxane was mixed with 10 cc. of benzyldimethylamine and 40 cc. of water, and the mixture agitated at room temperature over a period of 24 hours. The aminated product was recovered by evaporating the solution to dryness. The product was a quaternary ammonium chloride. It was soluble in water. It was analyzed and found to contain 3.85 per cent by weight of nitrogen. A solution consisting of 0.5 part by weight of the aminated product and 99.5 parts of distilled water had an absolute viscosity of 7.9 centipoises at 25° C.

EXAMPLE 4

The experiment of Example 1 was repeated, except that the chloromethylation reaction was carried out at a temperature of 25° C. After a reaction period of 19 hours, a noticeable increase in the viscosity of the reaction mixture was observed. The reaction was stopped by adding thereto a solution consisting of two gallons of dioxane and one gallon of water. The resulting solution was sprayed into admixture with water to precipitate the chloromethylated polymer. The product was separated by filtering, was washed with water and was dried in air at room temperature. The dry chloromethylated polymer was soluble in toluene. It was analyzed and found to contain 9.39 per cent by weight of chlorine. This corresponds to about 0.32 chloromethyl radical per aromatic nucleus in the product.

EXAMPLE 5

A solution consisting of 1400 cc. of dioxane and 200 grams of the chloromethylated polystyrene of Example 4 was mixed with 200 cc. of dimethylethanolamine. The mixture was agitated at room temperature over a period of one hour, during which reaction time a white precipitate formed. Thereafter, 500 cc. of water was added to the mixture and agitation continued at room temperature over a period of 16 hours longer. The precipitate dissolved. The solution was then poured into a shallow vessel and evaporated to dryness by heating to a temperature of 50° C. in a vacuum oven over a period of 4 hours. The aminated product or residue was a tan colored brittle solid. It was in the form of its quarternary ammonium chloride salt. The product was insoluble in water, but was soluble in a solution consisting of equal parts by volume of acetone and water.

EXAMPLE 6

A solution consisting of 1400 cc. of chloromethyl methyl ether and 250 grams of polystyrene, having a viscosity characteristic (10 per cent by weight in toluene) of 37 centipoises at 25° C., was placed in a glass reaction flask equipped with a reflux condenser and stirrer. The solution was stirred and 40 grams of zinc chloride added thereto as catalyst. The mixture was maintained at a reaction temperature between 35° C. and 37° C. over a period of about 2.5 hours. Test portions of the reacting mixture, each consisting of 50 cc., were withdrawn from the vessel at successive intervals during the reaction period. The test portions were poured into Formula 30 alcohol to precipitate the polymer. The chloromethylated polymer from each of the test portions was separated by filtering and was washed with alcohol and dried in air at room temperature. Table I states the conditions of time and temperature employed in carrying out the chloromethylation reaction and gives the per cent by weight of chlorine in each portion of the chloromethylated polystyrene withdrawn during the reaction period. The chloromethylated polystyrene from each of the test portions was soluble in toluene.

Table I

| Test No. | Reaction Time, Hours | Temp., ° C. | Percent Chlorine |
|---|---|---|---|
| 0 | 0 | 37 | |
| 1 | 0.6 | 35 | 3.12 |
| 2 | 1.5 | 35 | 4.32 |
| 3 | 1.8 | 35 | 5.15 |
| 4 | 2.5 | 35 | 6.10 |

EXAMPLE 7

A solution, consisting of 25 cc. of dioxane and 4 grams of the chloromethylated polystyrene from Example 6 containing chloromethyl radicals in amount corresponding to 6.10 per cent by weight of chlorine in the polymer was mixed with 10 cc. of an aqueous solution containing 25 per cent by weight of trimethylamine. The mixture was sealed in a glass bottle and agitated at room temperature over a period of 16 hours. The resulting solution was evaporated to dryness. The aminated product or residue was soluble in a solution consisting of equal parts by volume of acetone and water. It was swollen by, but was insoluble in water alone.

EXAMPLE 8

A solution consisting of 1267 cc. of chloromethyl methyl ether and 163 grams of molding grade polystyrene was placed in a reaction flask equipped with a reflux condenser and stirrer. The solution was stirred and 7.5 grams of anhydrous aluminum chloride was added thereto as catalyst. The mixture was agitated and maintained at room temperature over a period of 18 hours. Thereafter, the solution was poured into Formula 30 alcohol to precipitate the chloromethylated polymer. The product was separated by filtering and was washed with alcohol. A portion of the product was dried and analyzed. It was found to contain 4.97 per cent by weight of chlorine. This corresponds to an average of about 0.16 chloromethyl radical per aromatic nucleus in the polymer. The chloromethylated polystyrene was soluble in toluene.

EXAMPLE 9

A solution consisting of 2 liters of chloromethyl methyl ether and 200 grams of molding grade polystyrene was placed in a glass reaction flask equipped with a reflux condenser and stirrer. The solution was stirred and 100 grams of anhydrous zinc chloride added thereto as catalyst. The mixture was stirred and maintained at room temperature over a period of about one hour, whereupon a substantial increase in the viscosity of the solution was observed. Thereafter, the reaction mixture was poured into 3 gallons of Formula 30 alcohol to precipitate the halomethylated polymer. The product was separated by filtering, was washed with alcohol and was dried in air at room temperature. There was obtained 267 grams of a white powdery product. It was analyzed and found to contain 14.54 per cent by weight of chlorine. This corresponds to an average of 0.52 chloromethyl radical per aromatic nucleus in the polystyrene. The yield was 92.2 per cent of theory, based on the polystyrene starting material. The product was soluble in dioxane and toluene.

EXAMPLE 10

A solution consisting of 1000 grams of chloromethyl methyl ether and 100 grams of a homopolymer of alpha-methyl styrene having a viscosity characteristic of 7 centipoises (10 weight per cent solution of the polymer in toluene) at 25° C., together with 20 grams of zinc chloride as catalyst was placed in a reaction flask equipped with a reflux condenser and stirrer. The mixture was stirred and maintained at temperatures between 25° and 30° C. over a period of five and one-half hours. No appreciable increase in the viscosity of the reaction mixture was observed. A portion of the reaction mixture was poured into alcohol to precipitate the polymer. The product was separated by filtering, was washed with alcohol and was dried in air at room temperature. The chloromethylated polymer was soluble in toluene and dioxane. It was analyzed and found to contain 10.95 per cent by weight of chlorine. This corresponds to an average of about 0.46 chloromethyl radicals per aromatic nucleus in the polymer.

To a solution consisting of 36 cc. of dioxane and 4 grams of the chloromethylated polymer there was added 5 cc. of an aqueous solution containing 23 per cent by weight of trimethylamine. The mixture was sealed in a glass bottle and agitated at room temperature over a period of one hour. The mixture was then diluted with 30 cc. of water and agitated over a period of 16 hours longer at room temperature. The solution was poured into a shallow dish and evaporated to dryness at room temperature. The residue or product was a clear brittle solid. It was soluble in water.

EXAMPLE 11

A solution consisting of 3420 grams of chloromethyl methyl ether and 250 grams of a homopolymer of alpha-methyl styrene having a viscosity characteristic of 13.5 centiposes (10 weight per cent solution of the polymer in toluene) at 25° C. was placed in a reaction vessel equipped with a reflux condenser and stirrer. The solution was stirred and 100 grams of anhydrous zinc chloride added thereto as catalyst. The resulting solution had an absolute viscosity of 6.2 centiposes at 25° C. The solution was stirred and maintained at temperatures between 26° and 34° C. for a period of one hour and forty minutes. The viscosity of the reaction mixture increased from 6.2 centipoises to 20 centipoises during this period. The reaction was stopped by adding a solution of 25 cc. of water and 75 cc. of dioxane to the mixture. The resulting mixture was poured into four gallons of agitated Formula 30 alcohol (a mixture consisting of 9 parts by volume of 95 per cent ethyl alcohol and 1 part of methyl alcohol) to precipitate the polymeric product. The polymer was separated by filtering, washed with alcohol and dried in air at room temperature. There was obtained 325 grams of a white powdery product. It was analyzed and found to contain 16.9 per cent by weight of chlorine. The chloromethylated polymer was soluble in dioxane and in toluene.

EXAMPLE 12

A solution consisting of 468 grams of dioxane and 132 grams of the chloromethylated polymer of Example 11, together with 250 cc. of an aqueous solution containing approximately 25 per cent by weight of trimethylamine, was sealed in a glass bottle and agitated at room temperature over a period of 16 hours. Thereafter, 250 cc. of water was added to the mixture and it was agitated at room temperature for 16 hours longer. The solution was then poured into a tray and the volatile ingredients evaporated in air at room temperature. There was obtained 167 grams of residue or product. It was analyzed and found to contain 5.18 per cent by weight of nitrogen and 12.8 per cent of chlorine. The aminated product was soluble in water. It was in the form of a quaternary ammonium salt, i. e. a water-soluble resinous polymer containing quaternary ammonium chloride groups.

EXAMPLE 13

One and one-half grams of an aqueous solution consisting of 93 per cent by weight of distilled water and 7 per cent of the aminated water-soluble resinous product containing quaternary ammonium chloride groups of Example 12 were mixed with a solution consisting of 20 grams of distilled water and 5 grams of "black strap" molasses. A flocculent precipitate was formed. The solution was filtered. The per cent of light having a wave length of 620 millimicrons transmitted through the solution was measured. The measured percentage of transmitted light for the solution of molasses, before and after treating the same, is compared with the per cent of light transmitted through distilled water in a standard one centimeter cell. The treated molasses solution had a light transmission value of 74.5 per cent, whereas the molasses solution prior to treatment had a light transmission value of only 53.5 per cent.

Other modes of applying the principle of the invention may be employed instead of those explained, change being made with regard to the steps or compositions herein disclosed, provided the steps or ingredients stated by any of the following claims or the equivalent of such steps or ingredients be employed.

I claim:

1. A method of making a toluene-soluble chloromethylated polymer which comprises reacting a solution of one part by weight of a soluble resinous polymer of at least one alkenyl aromatic hydrocarbon selected from the group consisting of styrene and alpha-methyl styrene, in at least 4 parts of chloromethyl methyl ether, by forming the solution, adding a halomethylation catalyst to the solution and maintaining the mixture at temperatures between —10° and 60° C. during the reaction which occurs, whereby the viscosity of the solution becomes greater as the chloromethylation reaction proceeds, continuing the reaction until the solution has a viscosity value corresponding to the formation of a reaction product containing an average of from 0.1 to 1 chloromethyl radical per aromatic nucleus in the polymer and discontinuing the reaction prior to gelling of the solution.

2. A method of making a toluene-soluble chloromethylated polymer which comprises reacting a solution of one part by weight of a soluble resinous polymer of at least one alkenyl aromatic hydrocarbon selected from the group consisting of styrene and alpha-methyl styrene, in at least 4 parts of chloromethyl methyl ether, by forming the solution, adding a halomethylation catalyst to the solution and maintaining the mixture at temperatures between 10° and 50° C. during the reaction which occurs, whereby the viscosity of the solution becomes greater as the chloromethylation reaction proceeds, continuing the reaction until the solution has a viscosity value corresponding to the formation of a reaction product containing an average of from 0.1 to 1 chloromethyl radical per aromatic nucleus in the polymer and discontinuing the reaction prior to gelling of the solution.

3. The method as described in claim 2, wherein the polymeric starting material is polystyrene.

4. The method as described in claim 2, wherein the polymeric starting material is a homopolymer of alpha-methyl styrene.

5. The method as described in claim 2, wherein the chloromethyl methyl ether is employed in amount corresponding to from 4 to 20 parts by weight per part of the polymeric starting material.

6. The method as described in claim 2, wherein the catalyst is zinc chloride.

7. A toluene-soluble chloromethylated polymer of at least one alkenyl aromatic hydrocarbon selected from the group consisting of styrene and alpha-methyl styrene, which chloromethylated polymer contains an average of from 0.1 to 1 chloromethyl radical per aromatic nucleus in the polymer.

8. A toluene-soluble chloromethylated polymer of at least one alkenyl aromatic hydrocarbon selected from the group consisting of styrene and alpha-methyl styrene, which chloromethylated polymer contains an average of from 0.4 to 1 chloromethyl radical per aromatic nucleus in the polymer.

9. A toluene-soluble chloromethylated polystyrene containing an average of from 0.4 to 1 chloromethyl radical per aromatic nucleus in the polymer.

10. The method of making a resinous composition containing quaternary ammonium groups which resinous composition is soluble in a liquid mixture of equal parts by volume of water and dioxane, which method consists in reacting at temperatures between 20° and 100° C. a toluene-soluble chloromethylated polymer of at least one alkenyl aromatic hydrocarbon selected from the group consisting of styrene and alpha-methyl styrene, which chloromethylated polymer contains an average of from 0.1 to 1 chloromethyl radical per aromatic nucleus in the polymer, and a tertiary amine in amount such that each chlorine atom of the chloromethyl radicals in the polymer is replaced by a nitrogen atom of the tertiary amine.

11. The method of making a water-soluble resinous composition containing quaternary ammonium groups which consists in reacting at temperatures between 20° and 100° C. a toluene-soluble chloromethylated polymer of at least one alkenyl aromatic hydrocarbon selected from the group consisting of styrene and alpha-methyl styrene, which chloromethylated polymer contains an average of from 0.4 to 1 chloromethyl radical per aromatic nucleus in the polymer, and a tertiary amine in amount such that each chlorine atom of the chloromethyl radicals in the polymer is replaced by a nitrogen atom of the tertiary amine.

12. The method of making a water-soluble resinous composition containing quaternary ammonium groups which consists in reacting at temperatures between 20° and 100° C. a toluene-soluble chloromethylated polystyrene which contains an average of from 0.4 to 1 chloromethyl radical per aromatic nucleus in the polymer, and a tertiary amine in amount such that each chlorine atom of the chloromethyl radicals in the polymer is replaced by a nitrogen atom of the tertiary amine.

13. A resinous composition containing quaternary ammonium groups which resinous composition is soluble in a liquid mixture of equal parts by volume of water and dioxane and consists of the reaction product of a toluene-soluble chloromethylated polymer of at least one alkenyl aromatic hydrocarbon selected from the group consisting of styrene and alpha-methyl styrene, which chloromethylated polymer contains an average of from 0.1 to 1 chloromethyl radical per aromatic nucleus in the polymer, and a tertiary amine in amount such that each chlorine atom of the chloromethyl radicals in the polymer is replaced by a nitrogen atom of the tertiary amine.

14. A water-soluble resinous composition containing quaternary ammonium groups and consisting of the reaction product of a toluene-soluble chloromethylated polymer of at least one alkenyl aromatic hydrocarbon selected from the group consisting of styrene and alpha-methyl styrene, which chloromethylated polymer contains an average of from 0.4 to 1 chloromethyl radical per aromatic radical in the polymer, and a tertiary amine in amount such that each chlorine atom of the chloromethyl radicals in the polymer is replaced by a nitrogen atom of the tertiary amine.

15. A water-soluble resinous composition as claimed in claim 14, wherein the tertiary monoamine is dimethylethanolamine.

16. A water-soluble resinous composition as claimed in claim 14, wherein the tertiary monoamine is trimethylamine.

17. A water-soluble resinous composition as claimed in claim 14, wherein the tertiary monoamine is benzyldimethylamine.

18. A water-soluble resinous composition as claimed in claim 14, wherein the chloromethylated polymer is polystyrene and the tertiary monoamine is dimethylethanolamine.

19. A resinous composition which is soluble in at least one of the liquids dioxane and a mixture of equal parts by volume of water and dioxane, which resinous composition is a member of the group consisting of the toluene-soluble chloromethylated polymers of at least one alkenyl aromatic hydrocarbon selected from the group consisting of styrene and alpha-methyl styrene, said chloromethylated polymer containing on the aromatic nuclei an average of from 0.1 to 1 chloromethyl radical per aromatic nucleus in the polymer, and aminated derivatives thereof which are the reaction products of said chloromethylated polymers and a tertiary amine.

References Cited in the file of this patent

UNITED STATES PATENTS

| Number | Name | Date |
|---|---|---|
| 2,559,529 | Bauman | July 3, 1951 |
| 2,629,710 | McBurney | Feb. 24, 1953 |